US 8,230,023 B2

(12) United States Patent
French et al.

(10) Patent No.: US 8,230,023 B2
(45) Date of Patent: Jul. 24, 2012

(54) MANAGING EMAIL DISK USAGE BASED ON USER SPECIFIED CONDITIONS

(75) Inventors: Steven M. French, Austin, TX (US); Suhail H. Kazi, Karnataka (IN); Usha K. Ketineni, Portland, OR (US); Prasad V. Potluri, Austin, TX (US); Sharmila Potluri, Austin, TX (US); Rakesh Sharma, Austin, TX (US); Suzanne Shi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 815 days.

(21) Appl. No.: 11/749,836

(22) Filed: May 17, 2007

(65) Prior Publication Data

US 2008/0288598 A1 Nov. 20, 2008

(51) Int. Cl.
*G06F 15/16* (2006.01)
(52) U.S. Cl. .................. 709/206; 709/207; 707/102
(58) Field of Classification Search .............. 709/206, 709/207; 707/102
See application file for complete search history.

(56) References Cited

U.S. PATENT DOCUMENTS

| 6,816,885 | B1 | 11/2004 | Raghunandan |
| 7,007,067 | B1 * | 2/2006 | Azvine et al. ............ 709/206 |
| 7,136,897 | B1 | 11/2006 | Raghunandan |
| 2001/0056463 | A1 | 12/2001 | Grady et al. |
| 2002/0026487 | A1 | 2/2002 | Ogilvie et al. |
| 2003/0055985 | A1 | 3/2003 | Corb et al. |
| 2006/0010217 | A1 * | 1/2006 | Sood ........................... 709/206 |
| 2006/0031305 | A1 | 2/2006 | Keohane et al. |
| 2006/0031325 | A1 | 2/2006 | Cheng |
| 2006/0080354 | A1 | 4/2006 | Berger et al. |
| 2006/0117070 | A1 | 6/2006 | Thind et al. |
| 2006/0168046 | A1 * | 7/2006 | Qureshi ...................... 709/206 |
| 2006/0206569 | A1 | 9/2006 | Heidloff et al. |
| 2007/0083929 | A1 * | 4/2007 | Sprosts et al. ............. 709/206 |

OTHER PUBLICATIONS

"All about Quotas: Disk Space Storage; Bandwidth Transfer", SherwoodHosting.com, http://sherwoodhosting.com/quotas.html, 7 pages.
"About Quotas: Disk Usage; Email; Printing; Methods; Checking Usage; How to Reduce Your Email Usage; How to Reduce Your Disk Usage", Oregon State University, College of Engineering, http://engr.oregonstate.edu/computing/accounts/2, 3 pages.

* cited by examiner

*Primary Examiner* — Adnan Mirza
(74) *Attorney, Agent, or Firm* — Stephen J. Walder, Jr.; Steven L. Bennett (57) ABSTRACT

Mechanisms are provided for managing email disk usage based on user specified conditions. An incoming email for a user is scanned for email expressions. A determination is made as to whether one of the email expressions matches one of a number of listed expressions forming a matched expression. Responsive to a presence of a matched expression, a determination is made as to whether a first threshold associated with the matched expression is met or exceeded. Responsive to the first threshold being met or exceeded, a notification is sent to the user of the first threshold being met.

9 Claims, 4 Drawing Sheets

| EXPRESSION | SOFT LIMIT | HARD LIMIT | REJECT/TRASH INDICATOR |
|---|---|---|---|
| SENDER=user1@abc.com | 10MB | 50MB | REJECT |
| SENDER=*@xyz.com | 20MB | 30MB | TRASH |
| ATTACHMENT=JPEG/TIFF/GIF | 20MB | 40MB | TRASH |
| ATTACHMENT=DOC/XLS/PPT | 20MB | 40MB | REJECT |
| SENDER=manager@mycompany.com | UNLIMITED | UNLIMITED | |
| HEADER=*CONFIDENTIAL* | UNLIMITED | UNLIMITED | |
| HEADER=*PERSONAL* | 10MB | 20MB | TRASH |

MANAGING EMAIL DISK USAGE BASED ON USER SPECIFIED CONDITIONS

BACKGROUND

1. Technical Field

The present application relates generally to electronic mail (email). More particularly, the present application provides a method, system, and computer program product for managing email disk usage based on user specified conditions.

2. Description of Related Art

The size of email databases and the resources they consume on servers are important concerns for many companies. The larger the email databases, the more difficult it becomes for an administrative team to manage the backup and maintenance of the environment. Additionally, users see a reduction in performance on the server and on their workstations as they attempt to access the databases because of increases in processor, memory, disk Input/Output (I/O), and bandwidth requirements. It is important to understand that simply maintaining the size of the email database does not ensure the best user or server performance. In addition to the large size of the email database, the number of documents in a view, particularly the Inbox, can also degrade performance.

Many companies are facing increasingly stricter regulations on the retention of electronic messages for legal reasons, and therefore, a delicate balancing act exists to determine the appropriate course of action to control email database size. Many email systems provide a number of different configuration settings to allow flexibility in the implementation of maximum email sizes or quotas. Email quotas are basically configured by an administrator setting a maximum email size limit for each user and a warning threshold. For example, a user's mailbox may be set to a maximum of 250 MB with a warning threshold of 225 MB. When the size of all of the emails including attachments in the user's mailbox exceeds 225 MB, the email server sends the user a warning message informing the user to reduce the user's mailbox size. This may be performed through the user deleting emails or saving off large attachments. If the user fails to take corrective action and the user's mailbox exceeds the 250 MB maximum size, then the user's mailbox may be suspended to where the user cannot access their mailbox and the mailbox rejects all incoming emails. Other email quota configurations may allow the user to continue sending, receiving, and managing messages even after they have reached their quota.

A disadvantage to email quotas is that an email quota may easily be met due to one sender sending a large number of emails, accidentally or purposefully, and fill up the inbox of the user to the maximum limit. Such an event can cause the user not to receive any more emails from any sender. Currently, there are no known solutions to fix such a problem completely.

SUMMARY

The illustrative embodiments provide an email disk usage solution by enforcing condition specific disk usage limits. A user configures condition-specific usage limits that manage the usage of the user's mailbox. The user may configure their email account by specifying the disk usage limit on specific conditions, such as sender email address, header information, attachments, or the like.

The illustrative embodiments provide for managing email disk usage. The illustrative embodiments scan, for a user, an incoming email for a plurality of email expressions. The illustrative embodiments determine if one of the pluralities of email expressions matches one of a plurality of listed expressions to form a matched expression. The illustrative embodiments determine if a first threshold associated with the matched expression is met or exceeded in response to the presence of a matched expression. The illustrative embodiments send a notification of the first threshold being met to the user in response to the first threshold being met or exceeded.

In determining if the first threshold associated with the matched expression is met, the illustrative embodiments determine if emails within a predetermined set of email folders associated with the user have email expressions that match the matched expression, determine a cumulative size of all the emails with the matched expression including the incoming email, and determine if the cumulative size meets or exceeds a predetermined first size associated with the first threshold.

The illustrative embodiments provide that the plurality of email expressions include at least one of a sender's email address associated with the incoming email, text that appears in a header of the incoming email, or a type of attachment to the incoming email. The illustrative embodiments also provide that the plurality of listed expressions includes at least one of a sender's email address associated with the incoming email, text that appears in a header of the incoming email, or a type of attachment to the incoming email.

Additionally, the illustrative embodiments determine if a second threshold associated with the matched expression is met or exceeded in response to a presence of a matched expression, reject or trash the incoming email in response to the second threshold being met or exceeded, and send a notification of the second threshold being met to the user. The illustrative embodiments may also send a notification to a sender of the incoming email that the receiving of the incoming email has succeeded or failed.

In determining if the second threshold associated with the matched expression is met, the illustrative embodiments determine if emails within a predetermined set of email folders associated with the user have email expressions that match the matched expression, determine a cumulative size of all the emails with the matched expression including the incoming email, and determine if the cumulative size meets or exceeds a predetermined second size associated with the second threshold.

In other illustrative embodiments, a computer program product comprising a computer useable medium having a computer readable program is provided. The computer readable program, when executed on a computing device, causes the computing device to perform various actions, and combinations of, the operations outlined above with regard to the method illustrative embodiment.

In yet another illustrative embodiment, a system is provided. The system may comprise a processor and a memory coupled to the processor. The memory may comprise instructions which, when executed by the processor, cause the processor to perform various actions, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
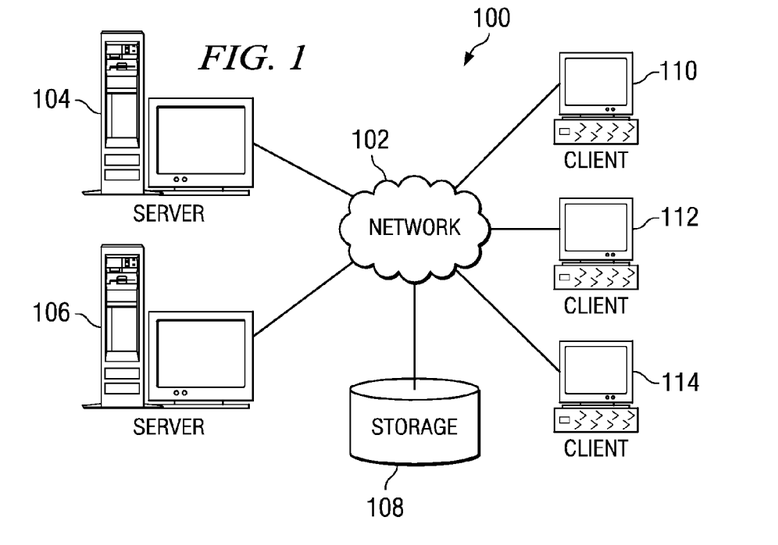
FIG. 1 is an exemplary diagram depicting a pictorial representation of an exemplary distributed data processing system in which aspects of the illustrative embodiments may be implemented.
Figure 2:
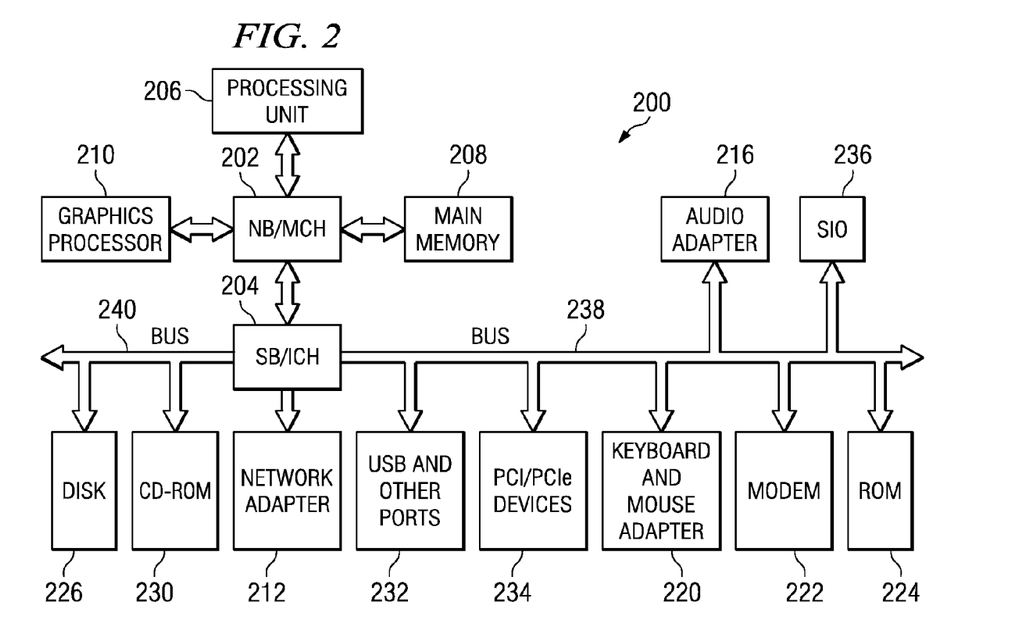
FIG. 2 is a block diagram of an exemplary data processing system in which aspects of the illustrative embodiments may be implemented.

The illustrative embodiments provide for managing email disk usage based on user specified conditions. FIGS. 1-2 are provided as exemplary diagrams of data processing environments in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide an email disk usage solution by enforcing condition specific disk usage limits. The condition specific disk usage limits are configurable by the user. The user may configure their email account by specifying the disk usage limit on specific conditions, such as sender email address, header information, attachments, or the like.

Figure 3:
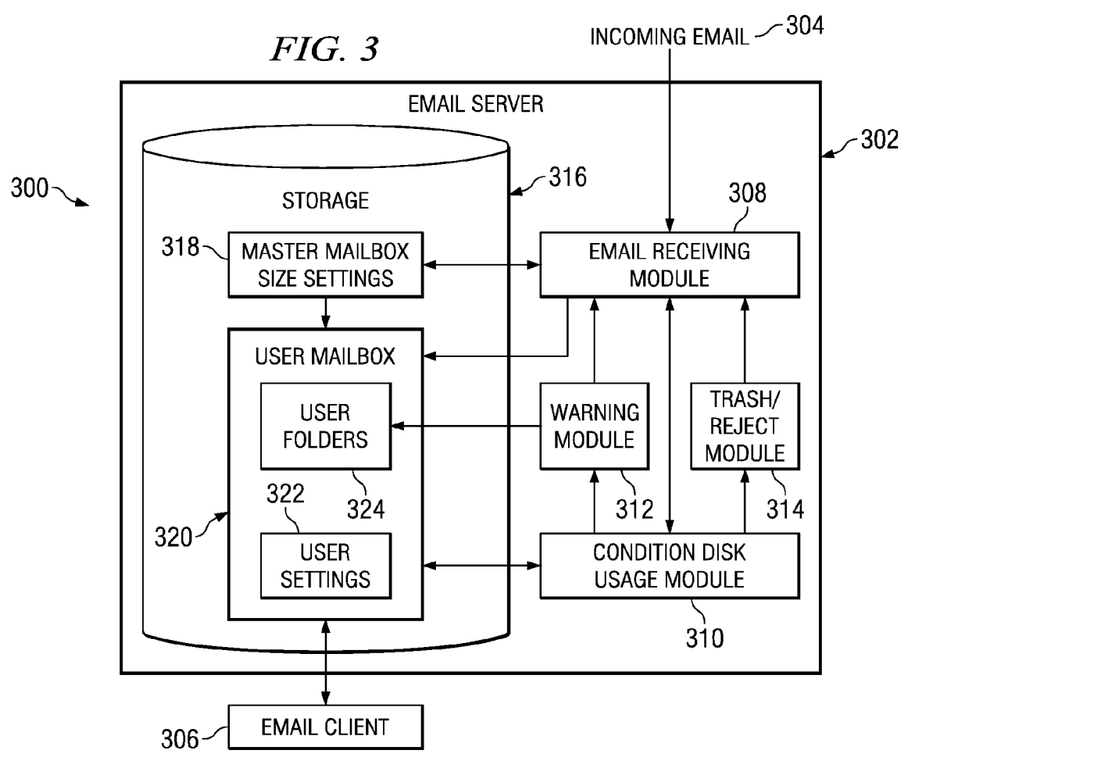
FIG. 3 depicts a functional block diagram of a condition specific email disk management system in accordance with an illustrative embodiment.

FIG. 3 depicts a functional block diagram of a condition specific email disk management system in accordance with an illustrative embodiment. Condition specific email disk management system 300 includes email server 302 and email client 306. Email server 302 is a computer program or software agent on a server, such as server 104 or 106 of FIG. 1, that transfers electronic mail messages from one computer to another. Email client 306 is a computer program on a client, such as client 110, 112, or 114 of FIG. 1, that is used to read and send email.

In this illustrative embodiment, email server 302 transfers incoming email 304, which may be an email coming from another email client or email server, to email client 306. In addition to the other components (not shown) of email server 302, email server 302 may also include email receiving module 308, condition disk usage module 310, warning module 312, trash/reject module 314, and storage device 316. Storage device 316 further includes master mailbox size settings 318 for each user of email server 302 and a server copy of user mailbox 320 for each user. While the illustrative embodiments indicate only one user mailbox 320, one of ordinary skill in the art would understand that email server 302 may contain multiple user mailboxes for various users.

When email receiving module 308 receives incoming email 304 from a sender, email server 302 uses master mailbox size settings 318 to determine if incoming email 304 will cause user mailbox 320 to exceed a maximum mailbox size or disk usage quota. If incoming email 304 does not exceed a disk usage quota for the user, email server 302 determines if the user receiving the email has indicated, through user settings 322, that conditional disk usage should be employed. Email server 302 may determine the use of conditional disk usage by checking the preferences indicated by the user in user settings 322. The user's preference of using conditional disk usage may be through the use of an identifier, such as a flag, a bit indicator, or the like stored in user settings 322. If the user has not indicated that conditional disk usage should be employed, email server 302 uses only master mailbox size settings 318 for determining disk usage quotas and, as long as the disk usage quota for the user has not been exceeded, email server 302 sends incoming email 304 to user folders 324 in user mailbox 320. If incoming email 304 does exceed a disk usage quota for the user, then the email is rejected and email receiving module 308 responds to the sender with a failure message.

If the user has indicated that conditional disk usage should be employed, condition disk usage module 310 checks incoming email 304 against a list of disk usage conditions defined by the user. The user may define, within a conditions table, specific disk usage conditions based on a specific email address, email header information, types of attachments, or other information that is commonly found associated with emails. User settings 322 may include a conditions table that stores a list of the user defined specific disk usage conditions.

Condition disk usage module 310 scans incoming email 304 for information, such as the sender's email address, specific information within the email header, types of attachments, or the like. Condition disk usage module 310 checks the scanned email information against the list of the user defined specific disk usage conditions. If any of the scanned email information meets one of the defined disk usage conditions, condition disk usage module 310 checks all or a portion of user folders 324 to determine if a soft limit or a hard limit for the specific condition is met. The user may specify certain email folders to be checked, such as only the Inbox or folders that store emails on email server 302.

If the emails that meet the condition within user folders 324 along with incoming email 304 violate a hard limit for the specific condition, condition disk usage module 310 employs trash/reject module 314 to either trash or reject incoming email 304 based on the defined specific disk usage conditions. If the incoming email is trashed by trash/reject module 314, email receiving module 308 responds to the sender with a success message. If the incoming email is rejected by trash/reject module 314, email receiving module 308 responds to the sender with a failure message.

If emails that meet the condition within user folders 324 along with incoming email 304 violate a soft limit for the specific disk usage condition, condition disk usage module 310 employs warning module 312 to send a warning email to the user indicating that the soft limit for the specific condition has been met, so that the user may take appropriate action. Warnings may be sent by warning module 312 each time the condition is met or based on a user defined interval, such as once daily, once a week, when the condition is again met, or the like. The user defined interval may be set in user settings 322. Condition disk usage module 310 then sends incoming email 304 to a user specified folder within user folders 324 and email receiving module 308 may send a successful delivery message to the sender.

If any of the email information within incoming email 304 does not correlate of the defined conditions, condition disk usage module 310 sends incoming email 304 to a user specified folder within user folders 324 and email receiving module 308 may send a successful delivery message to the sender.

Another illustrative embodiment uses counters to keep track of the total size of emails that meet each of the conditions listed in the conditions tables. As the user adds a condition to the conditions table, condition disk usage module 310 scans all or a portion of user folders 324 to determine a total size of emails that meet the conditions. Condition disk usage module 310 stores this number so that additional scans will not need to be performed. As emails that meet the condition are received, deleted or moved from folders that are part of the maximum mailbox size, condition disk usage module 310 adds or deletes the specific email size from the stored total size for that condition. Then condition disk usage module 310 continues with determining if a soft limit or a hard limit for the specific condition is met using the stored total size for the condition, rather than scanning all of the emails each time a new email meets one or more of the conditions.

While only two examples are described for determining if a soft limit or hard limit for a condition has been met, one of ordinary skill in the art would recognize that there are other ways of keeping track of the size of emails that meet a specific condition without departing from the scope of the present application.

Figure 4:
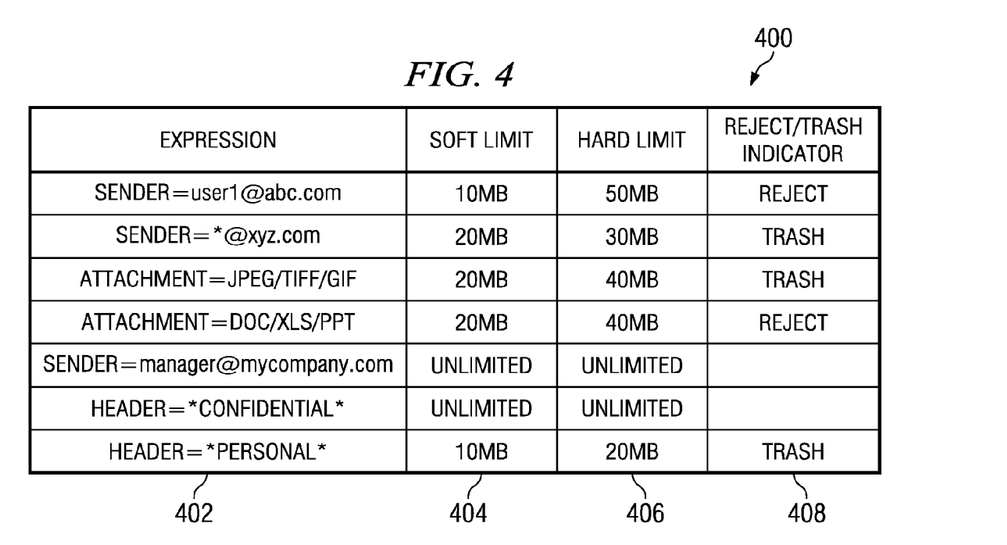
FIG. 4 depicts an exemplary table of specific disk usage conditions in accordance with an illustrative embodiment.

FIG. 4 depicts an exemplary table of specific disk usage conditions in accordance with an illustrative embodiment. Conditions table 400 lists a number of user defined specific disk usage conditions that the user desires to limit. Conditions table 400 includes expression 402, soft limit 404, hard limit 406, and reject/trash indicator 408. Expression 402 may be a specific email address, email header information, types of attachments, or other information that is commonly found associated with emails. The email addresses, headers, and attachments listed in conditions table 400 in no way limit the conditions for which an email could be scanned and checked. A condition disk usage module, such as condition disk usage module 310 of FIG. 3, uses conditions table 400 in determining if incoming emails and emails within a user's email folders violate a soft limit or a hard limit for the specific disk usage condition.

For example, if an incoming email has a sender's email address of user1@abc.com, the condition disk usage module would check conditions table 400 for the existence of the email address within expression 402. Since user1@abc.com is listed in conditions table 400, the condition disk usage module will employ a soft limit of 10 MB, a hard limit of 50 MB, and, if the hard limit is exceeded, reject email from user1@abc.com and send a hard limit exceeding notification, or if the soft limit is exceeded, accept the email and send a soft limit exceeding notification.

As another example, if an incoming email has an attachment that is a .tiff file, the condition disk usage module would check conditions table 400 for the existence of .tiff files within expression 402. Since .tiff files are listed in conditions table 400, the condition disk usage module will employ a soft limit of 20 MB, a hard limit of 40 MB, and, if the hard limit is exceeded, trash the email and send a hard limit exceeding notification, or if the soft limit is exceeded, accept the email and send a soft limit exceeding notification.

As a further example, if an incoming email has a header that includes the term "Confidential", the condition disk usage module would check conditions table 400 for the existence of headers that include the term *Confidential* within expression 402. Since headers with the term *Confidential* are listed in conditions table 400, the condition disk usage module will not employ a soft limit or a hard limit since both the soft limit and the hard limit are marked "unlimited."

The user may specify any hard limit or soft limit for a specific email address, email header information, types of attachments, or other information that is commonly found associated with emails. Additionally, the user may specify an unlimited soft limit and an unlimited hard limit for certain email conditions, such as emails from the user's manager or emails that contain the term "Confidential" in the header. Again, the email addresses, headers, and attachments listed in conditions table 400 in no way limit the conditions for which an email could be scanned and checked.

Figure 5:
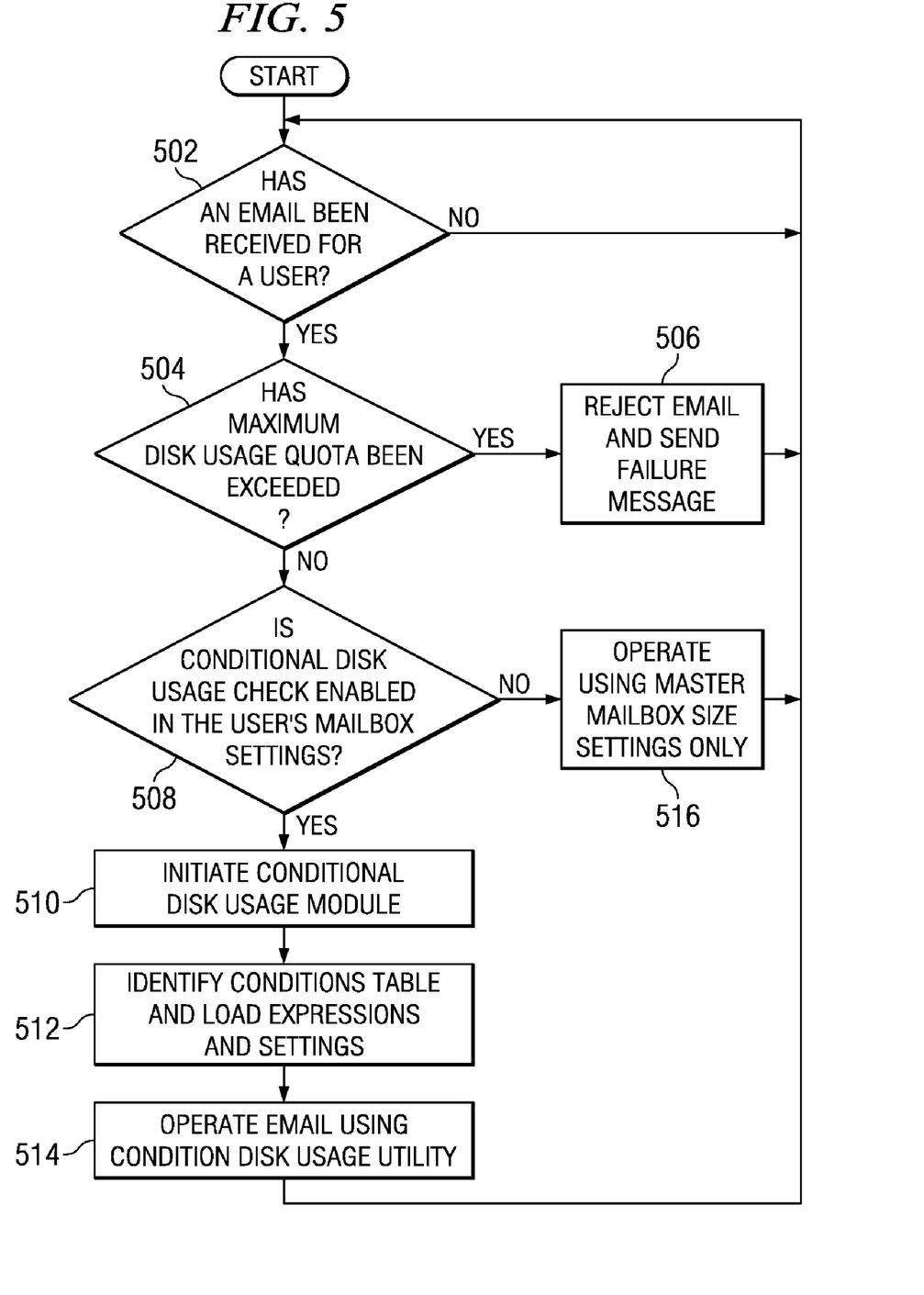
FIG. 5 shows an exemplary operation of an email server using a condition disk usage module in accordance with an illustrative embodiment.

FIG. 5 shows an exemplary operation of an email server using a condition disk usage module in accordance with an illustrative embodiment. As the operation begins, an email receiving module, such as email receiving module 308 of FIG. 3, determines if an email has been received for a user (step 502). If at step 502 an email has not been received for the user, the operation returns to step 502. If at step 502 an email has been received for a user, then the email server determines if the incoming email will cause the user mailbox to exceed a maximum disk usage quota (step 504). If at step 504 the incoming email exceeds the maximum disk usage quota, then the email is rejected and the email receiving module responds to the sender with a failure message (step 506), with the operation retuning to step 502 thereafter. If at step 504 the incoming email does not exceed a maximum disk usage quota for the user, then the email receiving module determines if the user has enabled conditional disk usage checking in the user's mailbox settings (step 508).

If at step 508, the user has indicated that conditional disk usage checking should be employed, the email server initiates a condition disk usage module, such as condition disk usage module 310 of FIG. 3 (step 510).

Then, the condition disk usage module identifies the user's conditions table, such as conditions table 400 of FIG. 4, within the user settings of the user mailbox and loads the expressions and settings identified with the conditions table (step 512). The condition disk usage module continually monitors the user's conditions table in the event the user adds, deletes, or changes any of the expressions within the conditions table. Using the expressions within the conditions table, the condition disk usage module scans incoming emails (step 514), with the operation retuning to step 502 thereafter. Returning to step 508, if the user has not indicated that conditional disk usage checking should be employed, the email receiving module operates using the master mailbox size settings only (step 516) with the operation retuning to step 502 thereafter.

Figure 6:
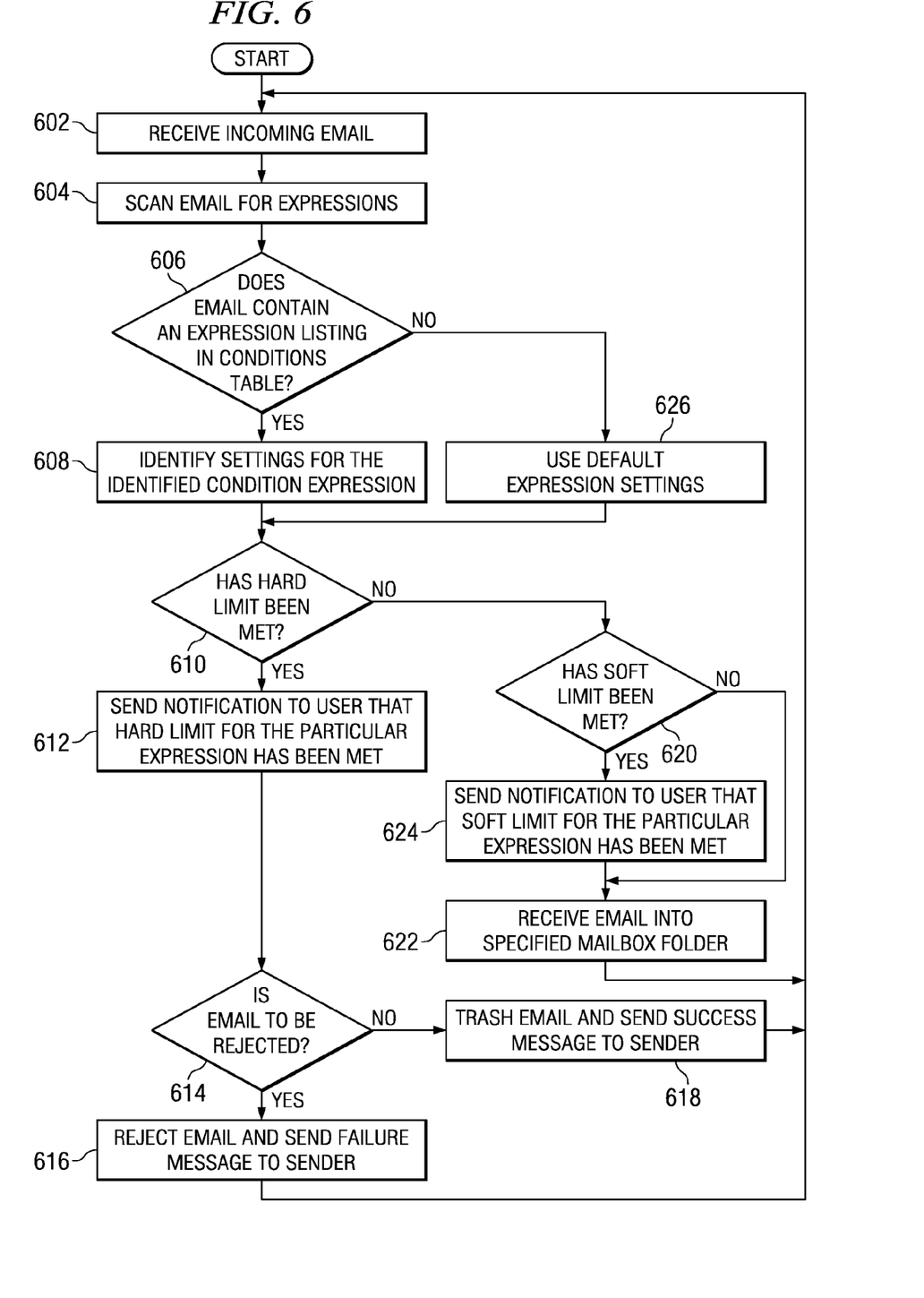
FIG. 6 shows an exemplary operation of checking an incoming email with a condition disk usage module in accordance with an illustrative embodiment.

FIG. 6 shows an exemplary operation of checking an incoming email with a condition disk usage module in accordance with an illustrative embodiment. The operation described in FIG. 6 is a further description of the operations performed in steps 510, 512, and 514 of FIG. 5. As the operation begins, the condition disk usage module, such as condition disk usage module 310 of FIG. 3, receives an incoming email from the email receiving module (step 602). The condition disk usage module scans the incoming email for expressions, such as the sender's email address, header information, types of attachments, etc. (step 604). The condition disk usage module then determines if the incoming email contains an expression that is also listed in the user's conditions table (step 606). If at step 606, the incoming email contains an expression that is also listed in the user's conditions table, the condition disk usage module then identifies the settings for the identified condition expression (step 608).

The condition disk usage module determines if the incoming email and emails with the same expression within all or a portion of user folders violate a hard limit associated with the identified condition expression (step 610). If at step 610 the incoming email and emails with the same expression within all or a portion of user folders violate the hard limit, the condition disk usage module sends a hard limit exceeding notification to the user (step 612). Then, a trash/reject module, such as trash/reject module 314 of FIG. 3, determines whether the incoming email should be rejected based on the defined specific disk usage conditions (step 614). If at step 614 the incoming email is to be rejected, the trash/reject module rejects the incoming email and the email receiving module responds to the sender with a failure message (step 616), with the operation retuning to step 602 thereafter. If at step 614 the incoming email is not to be rejected, the trash/reject module trashes the incoming email and the email receiving module responds to the sender with a success message (step 618), with the operation retuning to step 602 thereafter.

If at step 610 the incoming email and emails with the same expression within all or a portion of user folders do not violate the hard limit, the condition disk usage module determines if the incoming email and emails with the same expression within all or a portion of user folders violate the soft limit setting for the specific expression (step 620). The user may specify certain email folders to be checked, such as only the Inbox or folders that store emails on the email server.

If at step 620 the incoming email and emails with the same expression within all or a portion of user folders do not violate the soft limit, condition disk usage module sends the email to the users specified email folder, which is usually the Inbox (step 622), with the operation returning to step 602. If at step 620 the incoming email and emails with the same expression within all or a portion of user folders violate the soft limit, a warning module, such as warning module 312 of FIG. 3, sends a notification to the user that the soft limit for the identified expression has been violated (step 624). After warning module sends the notification to the user, condition disk usage module sends the email to the users specified email folder, which is usually the Inbox (step 622), with the operation returning to step 602.

Returning to step 606, if the incoming email does not contain an expression that is also listed in the user's conditions table, condition disk usage module may employ default expression settings (step 626), with the operation continuing to step 610 thereafter. Default expression settings may be settings the user employs to cover miscellaneous or junk email. That is, emails that do not fall into one of the expression categories of the conditions table. The default expression settings may be disabled by setting them to unlimited.

Thus, the illustrative embodiments provide an email disk usage solution by enforcing condition specific disk usage limits. The condition specific usage limits are configurable by the user. The user may configure their email account by specifying the disk usage limit on specific conditions, such as sender email address, header information, attachments, or the like.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for managing email disk usage based on user specified conditions, the computer implemented method comprising:

scanning, for a user, an incoming email for an email expression;

determining if the email expression matches one of a plurality of listed expressions to form a matched expression;

responsive to a presence of a matched expression, determining if a first threshold associated with the matched expression is met or exceeded;

responsive to the first threshold being met or exceeded, sending a notification of the first threshold being met to the user;

responsive to a presence of a matched expression, determining if a second threshold associated with the matched expression is met or exceeded;
responsive to the second threshold being met or exceeded, rejecting or trashing the incoming email; and
sending a notification of the second threshold being met to the user, wherein:
  the email expression is an identification, in a header of the incoming email, indicating a priority level of the incoming email,
  the plurality of listed expressions includes at least one of a priority identification, in email headers, indicating a priority level of an associated email, or an attachment type of attachments to email messages,
  determining if the email expression matches one of the plurality of listed expressions to form a matched expression comprises comparing the identification in the header of the incoming email to the priority identification in the plurality of listed expressions, and
  determining if the second threshold associated with the matched expression is met comprises:
    determining if emails within a predetermined set of email folders associated with the user have email expressions that match the matched expression;
    determining a cumulative size of all the emails with the matched expression including the incoming email; and
    determining if the cumulative size meets or exceeds a predetermined size associated with the second threshold.

2. The method of claim 1, wherein determining if the first threshold associated with the matched expression is met comprises:
  determining if emails within a predetermined set of email folders associated with the user have email expressions that match the matched expression;
  determining a cumulative size of all the emails with the matched expression including the incoming email; and
  determining if the cumulative size meets or exceeds a predetermined size associated with the first threshold.

3. A computer program product comprising a computer useable storage device having a computer readable program, wherein the computer readable program, when executed in a data processing system, causes the data processing system to:
  scan, for a user, an incoming email for an email expression;
  determine if the email expression matches one of a plurality of listed expressions to form a matched expression;
  responsive to a presence of a matched expression, determine if a first threshold associated with the matched expression is met or exceeded;
  responsive to the first threshold being met or exceeded, send a notification of the first threshold being met to the user;
  responsive to a presence of a matched expression, determine if a second threshold associated with the matched expression is met or exceeded;
  responsive to the second threshold being met or exceeded, reject or trash the incoming email; and
  send a notification of the second threshold being met to the user, wherein:
    the email expression is an identification, in a header of the incoming email, indicating a priority level of the incoming email,
    the plurality of listed expressions includes at least one of a priority identification, in email headers, indicating a priority level of an associated email, or an attachment type of attachments to email messages,
    the computer readable program causes the data processing system to determine if the email expression matches one of the plurality of listed expressions to form a matched expression by comparing the identification in the header of the incoming email to the priority identification in the plurality of listed expressions, and
    the computer readable program causes the data processing system to determine if the second threshold associated with the matched expression is met further causes the data processing system to:
      determine if emails within a predetermined set of email folders associated with the user have email expressions that match the matched expression;
      determine a cumulative size of all the emails with the matched expression including the incoming email; and
      determine if the cumulative size meets or exceeds a predetermined second size associated with the second threshold.

4. The computer program product of claim 3, wherein the computer readable program to determine if the first threshold associated with the matched expression is met further causes the data processing system to:
  determine if emails within a predetermined set of email folders associated with the user have email expressions that match the matched expression;
  determine a cumulative size of all the emails with the matched expression including the incoming email; and
  determine if the cumulative size meets or exceeds a predetermined first size associated with the first threshold.

5. A system, comprising:
  a processor; and
  a memory coupled to the processor, wherein the memory comprises instructions which, when executed by the processor, cause the processor to:
  scan, for a user, an incoming email for an email expression;
  determine if the email expression matches one of a plurality of listed expressions to form a matched expression;
  responsive to a presence of a matched expression, determine if a first threshold associated with the matched expression is met or exceeded;
  responsive to the first threshold being met or exceeded, send a notification of the first threshold being met to the user;
  responsive to a presence of a matched expression, determine if a second threshold associated with the matched expression is met or exceeded;
  responsive to the second threshold being met or exceeded, reject or trash the incoming email; and
  send a notification of the second threshold being met to the user, wherein:
    the email expression is an identification, in a header of the incoming email, indicating a priority level of the incoming email,
    the plurality of listed expressions includes at least one of a priority identification, in email headers, indicating a priority level of an associated email, or an attachment type of attachments to email messages,
    the instructions cause the processor to determine if the email expression matches one of the plurality of listed expressions to form a matched expression by comparing the identification in the header of the incoming email to the priority identification in the plurality of listed expressions, and
    the instructions to determine if the second threshold associated with the matched expression is met further cause the processor to:

determine if emails within a predetermined set of email folders associated with the user have email expressions that match the matched expression determine a cumulative size of all the emails with the matched expression including the incoming email; and determine if the cumulative size meets or exceeds a predetermined second size associated with the second threshold.

6. The system of claim 5, wherein the instructions to determine if the first threshold associated with the matched expression is met further cause the processor to:

determine if emails within a predetermined set of email folders associated with the user have email expressions that match the matched expression;

determine a cumulative size of all the emails with the matched expression including the incoming email; and determine if the cumulative size meets or exceeds a predetermined size associated with the first threshold.

7. The method of claim 1, wherein the plurality of listed expressions comprises a conditions data structure having one or more entries, and wherein each entry in the conditions data structure comprises an expression identifier, a soft size limit indicating a total size of store emails having the corresponding expression identifier at which a warning message is output to the user, a hard size limit indicating a total size of stored emails having the corresponding expression identifier at which an incoming email is either trashed or rejected, and a trash/reject indicator indicating whether an incoming email is to be either trashed or rejected in response to the hard size limit being met or exceeded.

8. The computer program product of claim 3, wherein the plurality of listed expressions comprises a conditions data structure having one or more entries, and wherein each entry in the conditions data structure comprises an expression identifier, a soft size limit indicating a total size of store emails having the corresponding expression identifier at which a warning message is output to the user, a hard size limit indicating a total size of stored emails having the corresponding expression identifier at which an incoming email is either trashed or rejected, and a trash/reject indicator indicating whether an incoming email is to be either trashed or rejected in response to the hard size limit being met or exceeded.

9. The system of claim 5, wherein the plurality of listed expressions comprises a conditions data structure having one or more entries, and wherein each entry in the conditions data structure comprises an expression identifier, a soft size limit indicating a total size of store emails having the corresponding expression identifier at which a warning message is output to the user, a hard size limit indicating a total size of stored emails having the corresponding expression identifier at which an incoming email is either trashed or rejected, and a trash/reject indicator indicating whether an incoming email is to be either trashed or rejected in response to the hard size limit being met or exceeded.

* * * * *